INVENTORS
DONALD B. BRICK
GEORGE G. PICK

BY

ATTORNEY

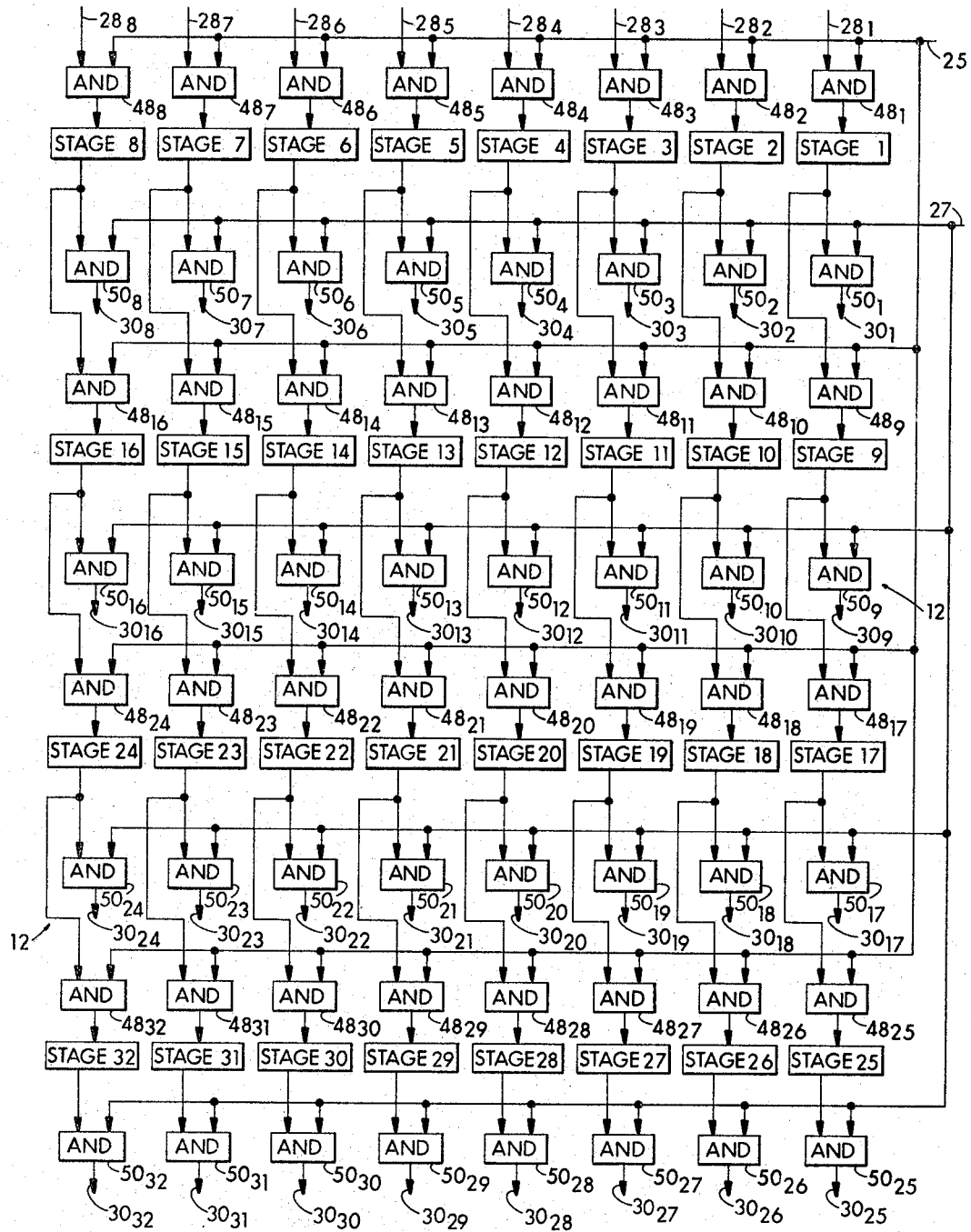

INVENTORS
DONALD B. BRICK
GEORGE G. PICK

United States Patent Office 3,334,335
Patented Aug. 1, 1967

3,334,335
ELECTRONIC DATA PROCESSING
Donald B. Brick and George G. Pick, Lexington, Mass., assignors to Sylvania Electric Products Inc., a corporation of Delaware
Filed May 27, 1964, Ser. No. 370,552
6 Claims. (Cl. 340—172.5)

This invention is concerned with electronic data processing systems and, more particularly, with word recognition systems.

Electronic word recognition systems have heretofore been developed which receive a word in a language and determine where that word is stored. That is, they produce an address as an output in response to a word input. Such systems are useful for language translation when used in conjunction with another storage means which stores the foreign language equivalent of each English word at the same address. The English word is analyzed by the word recognition system and its address found and transmitted to the associated memory where it is used to read out the same word in the foreign language.

Another use for systems of this type is in improving the output of a device such as an optical word scanner which often loses or misreads one or more letters of a word. The word recognition systems analyzes the incorrect word, and then generates the address of the stored word that best matches the input word so that it may be read out.

One known word recognition system comprises a logic matrix which decodes the word and puts out the address where it may be found. Such a system, however, is impractical for the purpose because of the great amount of space required for storing even a few words.

Other prior systems utilize a semi-permanent memory for storing each word, an input word being compared with the stored words and a signal generated when a match is found. This signal is subsequently used to determnie the address of the correct stored word. One problem which prevails in these systems is that the responses for a match and a mismatch may not be distinguished accurately without the use of complicated detection circuitry. This is true in some systems because the outputs for both match and mismatch are of thè same polarity and fairly close in amplitude. Others generate signals of either polarity, depending upon the conditions of search and storage so that a similar signal is not generated for each match condition. Also, previous systems have generally used serial sequential comparisons which are time-consuming and require a great deal of intermediate storage if a "best match" type of operation is utilized.

When it is considered that each of the twenty-six letters of the alphabet must be represented by a different binary number, each of which requires five bits if a straight binary code is used, this shortcoming is of considerable consequence.

With an appreciation of the shortcomings of prior art systems, applicants have as a primary object of the present invention to provide an improved word recognition system having a capability for storing large amounts of data in a comparatively small space while allowing high speed, completely random access based on an input word.

A further object of the invention is to provide a word recognition system capable of generating a word match indication which is significantly different from a mismatch indication and uniform each time.

Another object is to provide in a word recognition system, improved means for locating a stored word.

These and related objects are accomplished in one embodiment of the invention by a word recognition system which comprises a letter coder, a shift register, a word length selector, a driver matrix, a semi-permanent memory unit, an output selector, a binary coder, and an output register. The memory unit features a plurality of planar arrays of plastic sheets stacked one upon the other and a plurality of solenoids, each passing through all the planar arrays. In the embodiment to be described, each sheet is arranged to store a four, a three, a two, and a one letter word. A letter is represented by eight etched windings, each arranged to selectively encircle or bypass a solenoid, depending upon the bit being stored at that position.

A letter is received in binary notation at the inputs of the letter coder which converts the letter notation to a specialized "two out of eight" code, which uses binary digits and represents each letter by different orders of two ONE's and six ZERO's. Any other code in which a letter can be represented by a fixed number of assertive bits can also be used; e.g., "one out of twenty-six" or "three out of seven." Each coded letter from the coder is applied to the shift register where it is stored until a full word is received. The word length selector senses this word and determines how many letters it contains. The driver matrix receives the word from the shift register and the word length indication from the selector and drives only those solenoids in the memory unit which correspond to the correct word length. Three solenoids are driven for each letter of the word, two of which correspond to those positions in the "two out of eight" code whose value is a ONE, and the third is a bias solenoid which is driven each time its associated letter solenoids are driven, regardless of which letter of the alphabet is being searched. Each letter solenoid has its winding wound in the same direction and with the same density, thus producing a $+1$ signal weighting. Each bias solenoid, on the other hand, has its winding wound in the opposite direction with one-half the density of the letter solenoid windings, thus producing a $-2$ signal weighting, as will be explained below under the heading Memory Unit. Whenever a letter solenoid is driven, a stored ONE generates a positive signal, and whenever a bias solenoid is driven, its winding generates a negative signal of twice the letter signal magnitude. All windings on a single plane are connected in series whereby these signals add algebraically. Consequently, a correct word generates a null since the $-2$ signal cancels the two $+1$ signals and an incorrect word generates a negative signal since none or only some of the $-2$ signal is canceled for each incorrect letter. The outputs from the plural planes are sensed by the output selector which determines which plane contains the correct or most nearly correct word. The binary coder generates a numerical designation for this plane in binary form and the binary designation of the word length, both of which are stored in the output register.

Other objects, features, advantages, and embodiments of the invention will become apparent, and its construction and operation better understood, from the following detailed description, read in conjunction with the accompanying drawings, wherein:

FIG. 3 is a block diagram of the shift register portion of the system of FIG. 1;

Figure 1:
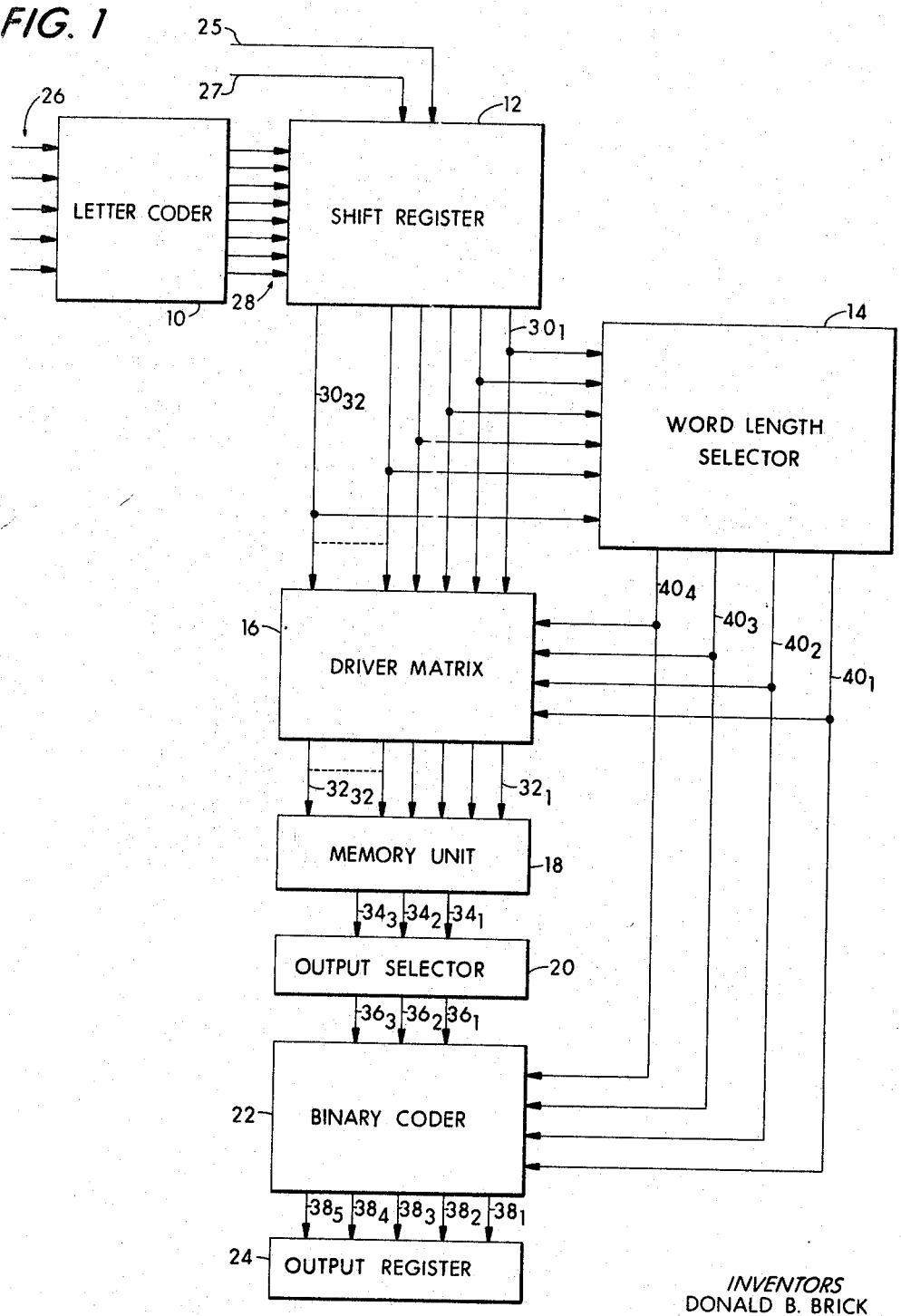
FIG. 1 is a block diagram of a preferred embodiment of a word recognition system according to the invention.

Referring now to FIG. 1, a preferred embodiment of the word recognition system is shown in block diagram form and comprises a letter coder 10, a shift register 12, a word length selector or parameter determining means 14, a driver matrix 16, a memory unit 18, an output selector 20, a binary coder 22, and an output register 24. The memory unit 18, which is of the semi-permanent type shown in FIG. 6, features a plurality of planar arrays of plastic sheets 66, stacked one upon the other, and a plurality of solenoids 68, each passing through aligned openings in all of the planes. Each plane 66 is arranged to store a four, a three, a two, and a one letter word. Consequently, the address of the desired word, when located, is described by the number of the plane 66 in which it is located and the word length. A letter is represented by eight etched windings 96 (FIG. 8), each being selectively arranged to form an electrical conductive path which encircles or bypasses its respective solenoid 68, depending upon the bit being stored at that position. The reason for this arrangement will become apparent from the following brief description of the system and its operation.

A letter is received in binary or any other explicit notation at the inputs 26 to letter coder 10 which comprises a logic matrix (FIG. 2) for converting the letter notation from binary to a specialized "two out of eight" code. This code utilizes binary digits which are selectively arranged in different orders so that each letter of the alphabet is represented by two ONE's and six ZERO's. The shift register 12 (FIG. 3) comprises a plurality of flip-flop stages, with accompanying input and output gates for storing the letters from coder 10 until a full word is received. The word length selector 14 (FIG. 4) comprises a logical matrix for sensing the word stored in shift register 12 and for determining how many letters the word contains. Drive matrix 16 (FIG. 5) comprises a logical diode matrix which receives the full word from shift register 12 and the word length indication from selector 14, and drives only those solenoids 68 in memory unit 18 which correspond to the correct word length. Three solenoids 68 only are driven for each letter of the word in order that no voltage is generated in the plane 66 (FIG. 6) storing the matching word. Two of these represent those positions in the "two out of eight" code for the letter having a ONE value. The third is used for biasing and is driven each time that two of its associated letter solenoids 68 are driven regardless of which letter of the alphabet is being searched. Each letter solenoid 68 has its winding 90 wound in the same direction and with the same density, thus providing a +1 weighting. The bias solenoids 68, on the other hand, have their windings 90 wound in the opposite direction to the letter solenoids 68 but with one-half their density, thus providing a −2 weighting. Whenever a letter solenoid 68 is driven, an encircling stored ONE conductive winding 96 (FIG. 6) generates a positive signal whereas a stored ZERO winding 96 generates no signal. Similarly, whenever a bias solenoid is driven, its conductive winding 96 produces negative signals each having twice the magnitude of a stored ONE signal. All windings 96 on a single plane 66 are connected in series whereby their signals algebraically add. Consequently, a correct word generates no output signal and an incorrect word generates a negative signal. This occurs because the two positive signals generated by a correct letter will subtract from the negative signal generated by the bias winding to produce a resultant of no signal whereas an incorrect letter will have either one or no positive signals to subtract from the negative signal. The outputs of the planes are sensed by output selector 20 which comprises a plurality of circuits (FIG. 9) for determining which plane contains the correct or the most nearly correct word. The binary coder 22 (FIG. 10) comprises a logic matrix which generates a numerical designation for the plane storing the correct word in binary form and the binary designation of the word length, both of which are then stored in output register 24 (FIG. 11) which comprises a plurality of flip-flop stages.

The following is a more detailed description of the various individual units in the word recognition system of the preferred embodiment.

*Letter coder*

Figure 2:
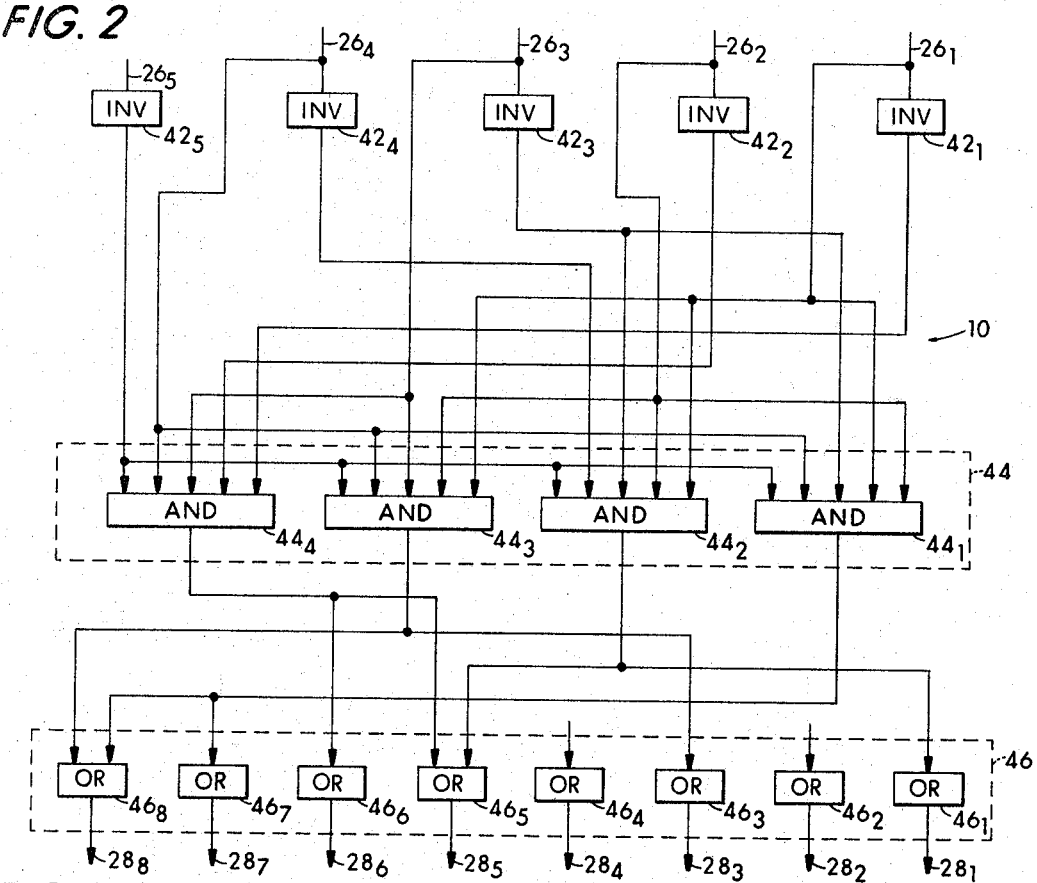
FIG. 2 is a block diagram of the letter coder portion of the system.

Letter coder 10, shown in FIG. 2, comprises a logic matrix of five inverter circuits $42_1$–$42_5$, twenty-six AND gates 44, and eight OR gates 46 for changing the designation of each letter of the alphabet from the binary code to the "two out of eight" code. The four-letter word "lock" having been chosen for the purpose of illustrating the construction and operation of coder 10, only four of the AND gates 44 are shown, one for each letter of this word; it will be understood that the complete unit requires twenty-six AND gates, one for each letter of the English alphabet.

Each letter of the alphabet and its binary and "two out of eight" representation are listed below to facilitate an understanding of the letter coder 10. This list was drawn arbitrarily but in practice could be modified by interchanging the letters.

| Letter | Binary | "Two Out of Eight" |
|--------|--------|--------------------|
| A | 00001 | 01000100 |
| B | 00010 | 00100010 |
| C | 00011 | 00010001 |
| D | 00100 | 10010000 |
| E | 00101 | 01001000 |
| F | 00110 | 00100100 |
| G | 00111 | 00010010 |
| H | 01000 | 00000110 |
| I | 01001 | 00011000 |
| J | 01010 | 01100000 |
| K | 01011 | 11000000 |
| L | 01100 | 00110000 |
| M | 01101 | 00001100 |
| N | 01110 | 00000011 |
| O | 01111 | 10000100 |
| P | 10000 | 01000010 |
| Q | 10001 | 00100001 |
| R | 10010 | 10000010 |
| S | 10011 | 01000001 |
| T | 10100 | 10100000 |
| U | 10101 | 01010000 |
| V | 10110 | 00101000 |
| W | 10111 | 00010100 |
| X | 11000 | 00001010 |
| Y | 11001 | 00000101 |
| Z | 11010 | 10001000 |

The purpose of inverters 42 is to provide the inverse condition of each bit forming the letter received in binary form so that one AND gate 44 may be activated when the binary code designating its letter is received from the device sending the letter in this form (not shown). In the present illustrative example, AND gate $44_4$ is responsive to the letter "L," AND gate $44_3$ is responsive to the letter "O," and AND gate $44_2$ and $44_1$ are responsive to the letters "C" and "K," respectively.

It being evident from the above list that the binary code for "L" is 01100, the five inputs to AND gate $44_4$ are from inverter $42_5$, line $26_4$, line $26_3$, inverter $42_2$, and inverter $42_1$, the AND gate sensing this when this binary word appears on input lines $26_1$–$26_5$. The binary code for letter "O" being 01111, AND gate $44_3$ is connected to inverter $42_5$, line $26_4$, line $26_3$, line $26_2$, and line $26_1$. The code for letter "C" is 00011; thereby AND gate $44_2$ is connected to inverter $42_5$, inverter $42_4$, inverter $42_3$, line $26_2$, and line $26_1$. The binary code for letter "K" is 01011 so that AND gate $44_1$ is connected to inverter $42_5$, line $26_4$, inverter $42_3$, line $26_2$, and line $26_1$. Whenever all signals at the inputs to an AND gate 44 are in the ONE condition, it generates a signal indicating that the letter received on input lines 26 is its corresponding letter.

Each OR gate 46 generates one bit of the "two out of eight" code. Referring again to the above table, the "two out of eight" code for "L" is 00110000. Consequently, when AND gate $44_4$ is activated, a ONE is applied to OR gates $46_6$ and $46_5$ so that this code is derived on outputs 28. Similarly, the "two out of eight" code for the letter "O" is 10000100, and when AND gate $44_3$ senses its letter, it applies a ONE to OR gates $46_8$ and $46_3$. The "two out of eight" code for letter "C" is 00010001, and an activated AND gate $44_2$ transfers a ONE to OR gates $46_5$ and $46_1$. The "two out of eight" code for a letter "K" is 11000000 so that OR gates $46_8$ and $46_7$ receive ONE's when AND gate $44_1$ senses the correct binary code.

In a similar manner, the "two out of eight" code is produced for the other letters of the alphabet. The outputs for each letter from coder 10 are transferred in parallel to shift register 12.

Shift register

The shift register 12 of FIG. 1, shown in more detail in FIG. 3, comprises thirty-two flip-flop stages with associated input gates 48 and output gates 50. Since the letters of a word are received in serial order, this register 12 is utilized for storing the "two out of eight" code for the letters of a word until the full word is assembled. The complete word is then emitted on lines 30 in parallel form.

Briefly, the operation of shift register 12 is as follows: Whenever the binary equivalent of a letter is received by letter coder 10 on lines 26, a voltage level is also applied to the shift register via line 25 (FIG. 1, FIG. 3) from the equipment (not shown) sending the letter. The letter notation is changed to the "two out of eight" code by letter coder 10, as explained above, and it appears on inputs $28_1$–$28_8$ to AND gates $48_1$–$48_8$, respectively. The presence of the voltage level on line 25 allows the letter code to pass through these AND gates 48 and to be stored in stages 1 through 8 of the register.

If a second letter is present in the word to be recognized, upon its receipt a voltage level again appears on line 25. The letter previously stored in stages 1 through 8 pass through AND gates $48_9$ through $48_{16}$ and is stored in stages 9 through 16. The "two out of eight" code for the new letter passes through AND gates $48_1$–$48_8$ and is stored in stages 1 through 8.

Should there be a third letter in the word, a voltage level again appears on line 25. The letter in stages 9–16 passes through AND gates $48_{17}$–$48_{24}$ and is stored in stages 17–24, and similarly, the letter in stages 1–8 passes through AND gates $48_9$–$48_{16}$ and is stored in stages 9–16. The "two out of eight" code for the third letter passes through AND gates $48_1$–$48_8$ and is stored thereafter in stages 1–8.

If a fourth letter is present in the word, a voltage level is again received on line 25. The letter in stages 17–24 passes through AND gates $48_{25}$–$48_{32}$ and is stored in stages 25–32. In like manner, the contents of stages 9–16 passes through AND gates $47_{17}$–$48_{24}$ and is stored in stages 17–24. The contents of stages 1–8 passes through AND gates $48_9$–$48_{16}$ and is stored in stages 9–16. The coded fourth letter appears on lines $28_1$–$28_8$, passes through AND gates $48_1$–$48_8$, and is stored in stages 1–8.

When the last letter of a word is received and stored, all shifting stops and the word appears on lines 30 in the following manner: A voltage level is applied to line 27 (FIG. 1, FIG. 3) from the letter sending apparatus after the last letter is stored, thus indicated that the word is complete. The contents of each stage passes through its associated AND gate 50 and appears on its output line 30. Consequently, the "two out of eight" code for the full word appears on lines 30 and is transferred to word length selector 14 and driver matrix 16.

Word length selector

Figure 4:
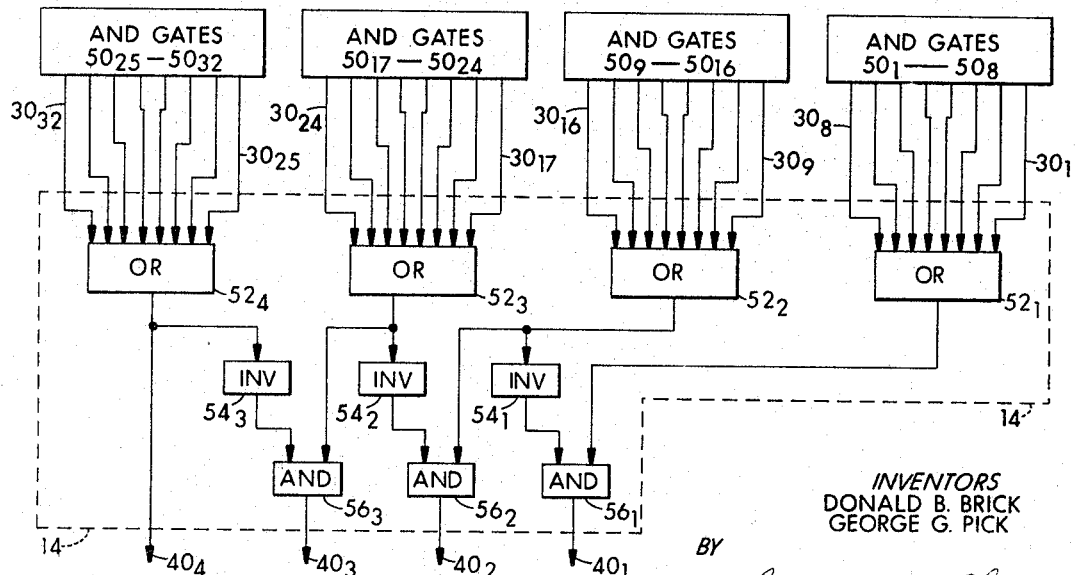
FIG. 4 is a block diagram of the word length selector circuit of the system of FIG. 1.

The word length selector or preselector means 14, shown in FIG. 4, comprises a logic matrix of four OR gates 52, three inverter circuits 54, and three AND gates 56 for finding the number of letters contained in the word being searched. This is done by sensing the word generated by shift register 12 and determining how many different separate "two out of eight" codes are contained in the word.

Each OR gate 52 is connected to eight AND gates 50 of shift register 12 and produces a signal on its output when any of its inputs is in the ONE condition. Thus, OR gate $52_1$ determines whether letter 4 is present; OR gate $52_2$ determines whether letter 3 is present; OR gate $52_3$ determines whether letter 2 is present; and, OR gate $52_4$ determines whether letter 1 is present.

This description of the invention assumes that all letters of the word received are present; i.e., that none have been lost in transit. An output from AND gate $56_1$ indicates that there is one letter in the word; an output from AND gate $56_2$ indicates that there are two letters; and an output from AND gate $56_3$ indicates that there are three letters. An indication of four letters is provided directly to output $40_4$. Each AND gate 56 is activated only when its associated OR gate 52 emits a ONE indicating that its letter is present and the OR gate which is located adjacent to it on its left emits a ZERO indicating that its letter is not present. Consequently, AND gate $56_1$ senses the output of OR gate $52_1$ and the inversion of the output of OR gate $52_2$, produced by inverter circuit $54_1$. AND gate $56_2$ senses the output of OR gate $52_2$ and the inversion of the output of OR gate $52_3$, generated by inverter circuit $54_2$. AND gate $56_3$ senses the output of OR gate $52_3$ and the inversion of the output of OR gate $52_4$, generated by inverter circuit $54_3$. An additional AND gate connected to OR gate $52_4$ is not necessary because a signal generated by OR gate $52_4$ on line $40_4$ is itself indicative of the fact that the word contains four letters.

Output lines 40 are connected to driver matrix 16 so that only that row in memory unit 18 which stores the words having the same number of letters as the word whose address is being located is sensed.

Driver matrix

Figure 5:
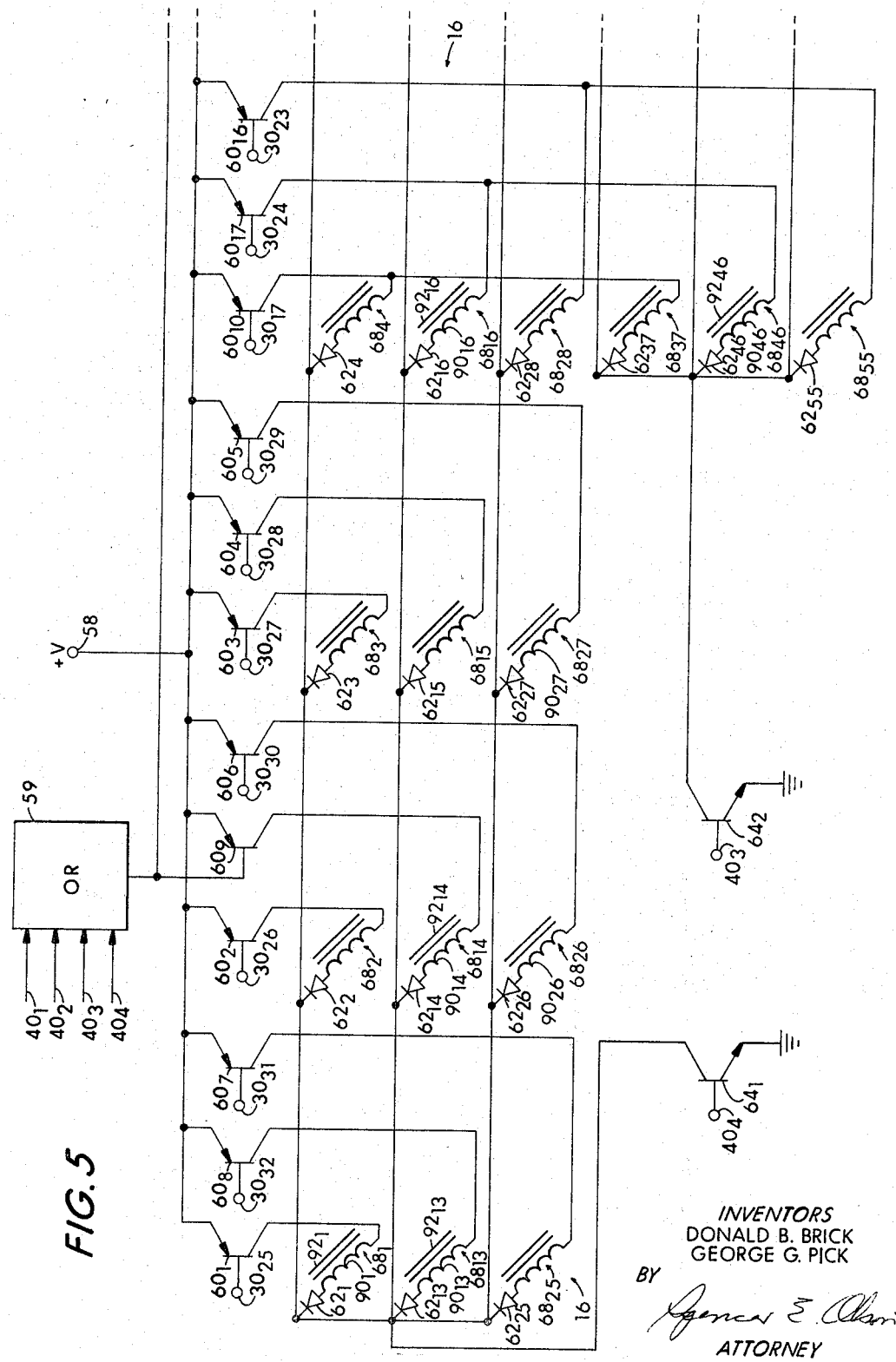
FIG. 5 is a diagrammatic representation of a portion of the driver matrix of the system.

Driver matrix 16 comprises a diode matrix, partially shown in FIG. 5, with associated row or word switches 64, column or letter switches 60, OR gate 59, and a positive voltage source represented by terminal 58. These are arranged for selectively driving solenoids 68 in memory unit 18 according to the content of the word received from shift register 12. Consequently, only those solenoids 68 corresponding to the word length found by word length selector 14 are driven and, within this group, only the bias solenoids 68 and those solenoids whose positions in the search words are ONE's. By driving only the ONE solenoid and no ZERO solenoids, less power is generated in searching for a word and a correct word generates no voltage each time. This is made possible by utilizing the specialized "two out of eight" code in which only two bits are ONE's since if they are found to be correct it is known that the remaining bits must be ZERO's. The bias solenoids 68 are driven so that the signals generated by their etched windings 96 on a plane 66 will subtract from the signals produced by two ONE windings for each letter to produce a difference of zero voltage, thus representing a correct word. This will be more fully described below under the heading Memory Unit.

Drive matrix 16 contains four transistor switches 64 for selecting those solenoids 68 having the correct word length. Transistor $64_1$ selects the four letter word solenoids, transistor $64_2$ selects the three letter word solenoids, a third transistor (not shown) selects the two letter word solenoids, and, a fourth transistor (also not shown) selects the solenoids associated with one letter words. In addition, thirty-six transistors 60, only twelve of which are shown and identified by subscripts 1, 2, 3, 4, 5, 6, 7, 8, 9, 10, 16 and 17, are used to select the bias and bit solenoids 68 in accordance with the word stored in shift register 12.

Figure 8:
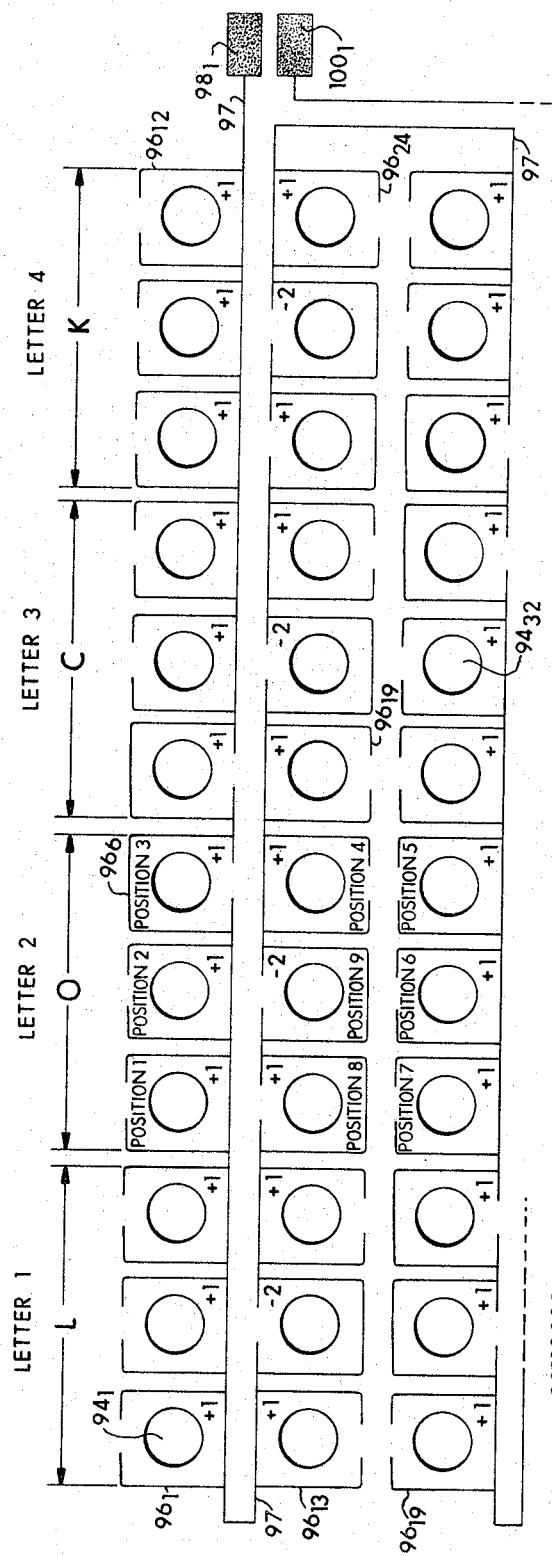
FIG. 8 is a diagrammatic representation of the conductive pattern on one of the planes of the type shown in FIG. 7 illustrating how the word "lock" is stored.

Every letter of the English alphabet is represented in memory unit 18 by nine etched windings 96, each in a different position as shown in FIG. 8. The first eight positions are used to store the bits of the "two out of eight" code, and position 9 is the bias position. One of the aforementioned transistors 60 is connected to all solenoids 68 having the same position and letter number for all word lengths. For instance, transistor $60_1$ is connected to all solenoids 68 in position of letter one for all word lengths. Since letter one may occur only in a four letter word, it is connected to solenoid $68_1$ only. Similarly, transistor $60_{10}$ is connected to all solenoids in position one of letter two for all word lengths. Since letter two occurs in both three and four letter words, it is connected to both solenoid $68_4$ and $68_{37}$. From this brief description of the construction of driver matrix 16, the nature and function of the remaining components and connections, which have been omitted from FIG. 5 for maintaining diagram simplicity, will be apparent to ones skilled in the data processing art.

The operation of driver matrix 16 will now be explained, assuming that the word "lock" is located in memory unit 18. This being a four letter word, word length selector 14 produces a signal on line $40_4$ which turns transistor $64_1$ on and also passes through OR gate 59 to turn on all transistors which drive the position 9 or bias solenoids 68, transistor $60_9$ in FIG. 5 being representative. In addition to these, others of transistors 60 are turned on according to the contents of the word received over lines 30 from shift register 12. Transistors $60_5$ and $60_6$ are turned on for this example because positions 5 and 6 of the letter "L" are ONE's. Transistor $60_{17}$ is also turned on because position 8 of the letter "O" is a ONE. Similarly, other transistors 60 are turned on according to the word content, but as they are not shown will not be described.

Current flows from positive voltage source 58, through a plurality of paths determined by which of transistors 60 are on and thence through resistor $64_1$, which is also on in this example, to ground. One path is through on transistor $60_9$, winding $90_{14}$ of bias solenoid $68_{14}$, diode $62_{14}$ and transistor $64_1$. A second path comprises conducting transistor $60_5$, winding $90_{27}$ of solenoid $68_{27}$, diode $62_{27}$ and transistor $64_1$. Another path comprises on transistor $60_5$, winding $90_{27}$ of solenoid $68_{27}$, and diode $62_{27}$. Another path comprises on transistor $60_{17}$, winding $90_{16}$ of solenoid $68_{16}$, and diode $62_{16}$. Since transistors $64_2$ is not turned on, diode $62_{46}$ is back-biased, thus preventing current from also flowing through winding $90_{46}$ of solenoid $68_{46}$. Thus, it is apparent that driver matrix 16 drives only those solenoids 68 whose etched windings 96 on the various planes 66 are to be searched for a stored ONE and their associated bias solenoids 68, and for words of only the correct length.

*Memory unit*

Figure 6:
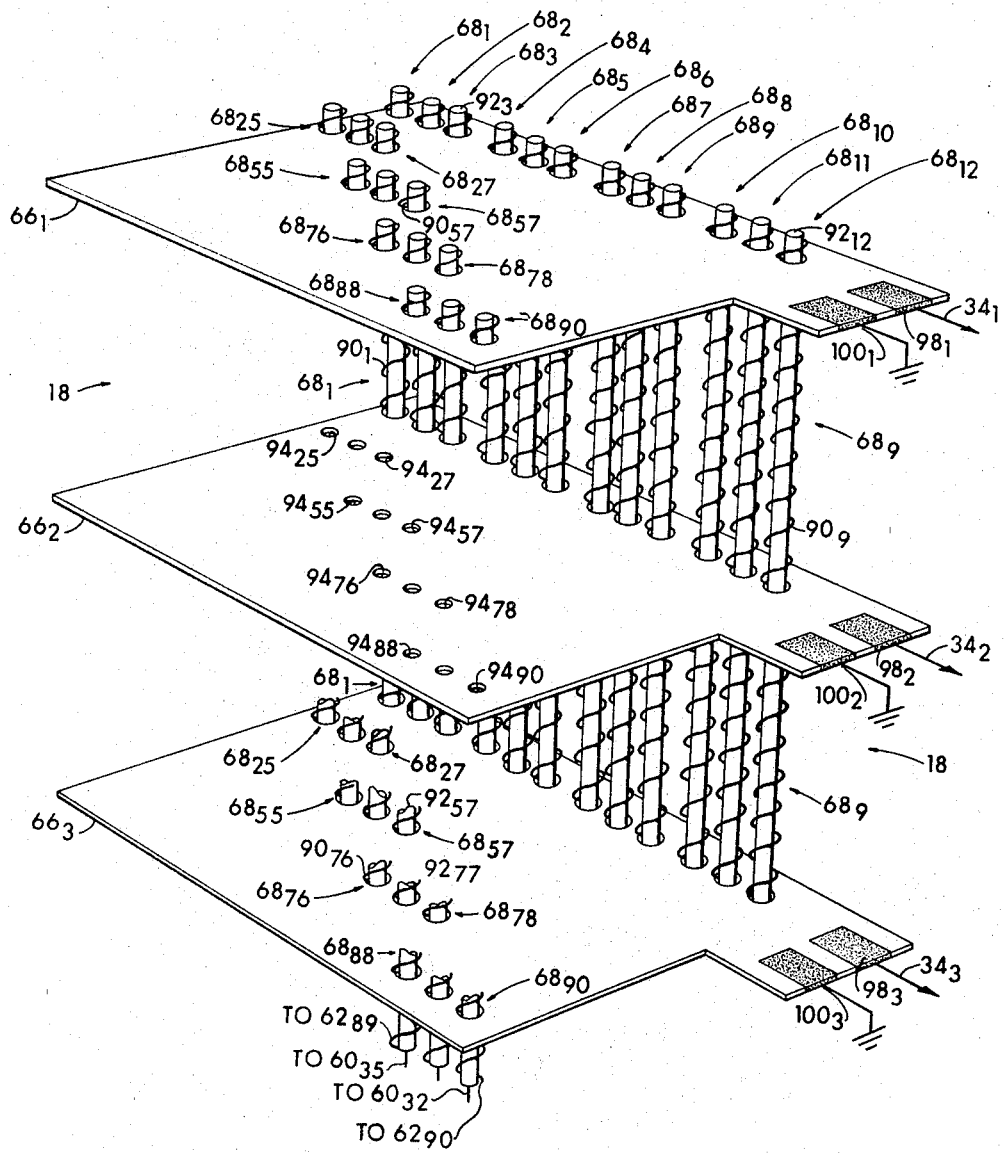
FIG. 6 is an exploded perspective view, partially broken away, of the memory unit embodied in the system of FIG. 1.

Memory unit 18, shown in FIG. 6, comprises a plurality of planes 66 (only three of which are shown) stacked one upon the other, and a plurality of solenoids 68 passing through aligned openings in but not mechanically connected to all of them. Whenever a solenoid 68 is driven, its winding 90 acts as a transformer primary and its encircling pickup windings 96 (FIG. 7) on planes 66 act as transformer secondaries. Each solenoid 68 when driven produces a uniform voltage along its entire length so as to induce signals of equal magnitude in all encircling pickup windings regardless of the location of the plane in the stack.

Figure 7:
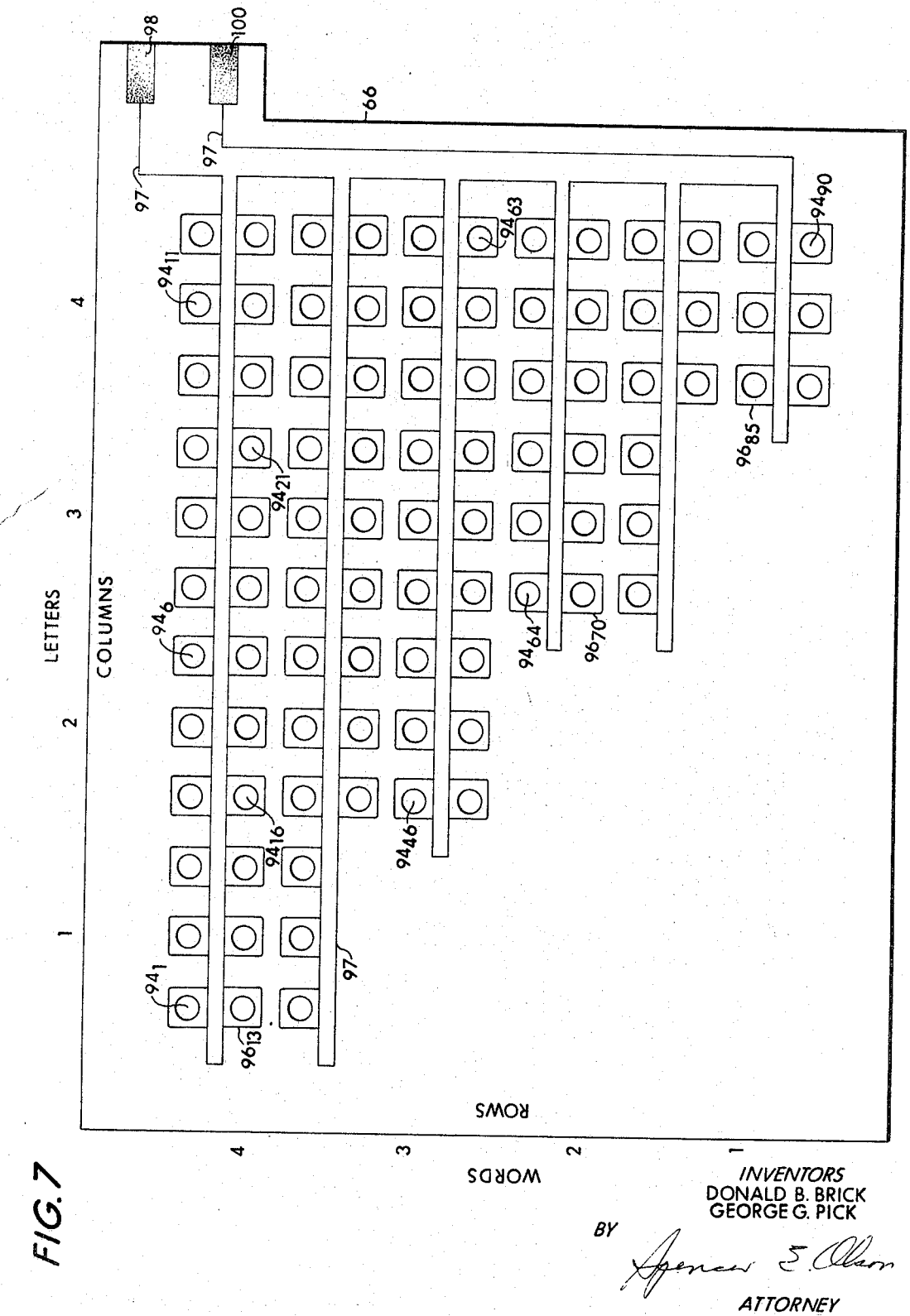
FIG. 7 is a plan view, somewhat diagrammatic, of one of the word planes of the memory unit of FIG. 6.

FIG. 7 shows a detailed layout of one of planes 66, each of which has the capability for storing a four letter word, a three letter word, a two letter word, and a one letter word. The plane has a plurality of holes 94 formed therein, a plurality of etched pick-up windings thereon connected in series to form a continuous path 97 between two terminals 98 and 100 affixed to an edge of the plane. The solenoids 68 in the assembled memory 18 pass through the holes 94 in all of the planes 66, but are not mechanically connected to them. To store a ONE, a pickup coil 96 is arranged to form a conductive path which encircles its associated hole, and to store a ZERO the coil 96 is arranged to form a conductive path which bypasses its hole. This bit storage is achieved by removing etching from windings 96 at selected places as shown in FIG. 8. From the list given previously for each letter and its "two out of eight" code representation, positions 1, 2, 3, 4, 7, and 8 are ZERO's for the letter "L"; positions 1, 2, 4, 5, 6, and 7 are ZERO's for the letter "O"; positions 2, 3, 4, 6, 7, and 8 are ZERO's for letter "C"; and, positions 1, 2, 3, 4, 5, and 6 are ZERO's for the letter "K." Consequently, at each of these positions the loop 96 is arranged to bypass its associated solenoid hole 94. Similarly, positions 5 and 6 are ONE's for the letter "L"; positions 3 and 8 are ONE's for the letter "O"; positions 1 and 5 are ONE's for the letter "C"; and, positions 7 and 8 are ONE's for the letter "K"; hence, at each of these positions the loop 96 is arranged to encircle its solenoid hole 94. For each letter, the loop 96 at position 9 encircles its solenoid hole; this loop is for biasing purposes, not for storage of a bit.

Each of the solenoids 68 shown in FIG. 6 includes a winding 90 and an elongated supporting rod or bobbin 92. Each winding 90 is single wound, being wound from bottom to top and then brought directly down to the bottom. The rod 92 is preferably formed of non-magnetic material such that each solenoid is the primary of an air core transformer. However, it will be appreciated that there are a number of other ways of implementing solenoids 68, some of which are described in co-pending patent application Ser. No. 302,696 now abandoned, filed Aug. 16, 1963 by Stephen B. Gray and George G. Pick, entitled "Memory Unit" and assigned to the assignee of the present application. The windings on the solenoids located at positions 1 to 8 are all wound in one direction, designated the positive direction, with a first density, hereafter termed unity density. However, the windings on the solenoids at all of the 9 positions are wound in the opposite or negative direction, and have half the density of the other windings. These differences in winding direction and densities causes signals of different magnitudes and polarities to be induced in the associated loops 96 on the information planes, a winding of unity density in the positive direction providing a weighting factor arbitrarily designated at +1, and a winding of half unity density in the negative direction providing a signal weighting of −2. This relationship obtains because a decrease in winding density by half reduces the inductance of the solenoid by a factor of four causing the current therein to be four times as great as in a winding of unity density for the same driving voltage. The flux produced by a solenoid being equal to the product of current and number of turns, the half-unity solenoid produces a flux having an amplitude twice that of those having unity winding density. The reason for these degrees of weighting is to insure that a plane storing a correct word generates a null or no signal at its output terminals. A driven winding 90 having a +1 weighting acts as a transformer primary and produces a positive pulse in each of its pickup windings 96 which is arranged for storing a ONE and no pulse is produced in those which are arranged for storing a ZERO. Similarly, whenever a bias winding 90 having a −2 weighting is driven, a negative signal, twice the magnitude of the aforementioned positive pulse, will be induced in its encircling pickup windings 96. Thus, if the word "lock" is being searched for and it is located on plane $66_1$, for instance, no signal would be generated at terminal $98_1$ because the two positive pulses for each letter would algebraically add to the one negative signal to produce a net of zero. A mismatch on planes $66_2$ and $66_3$ produces a negative signal whose amplitude depends upon the number of letters which do not match. Each output terminal 98 is connected to output selector 20 via a line 34.

Although only three planes 66 are shown in FIG. 6, it should be understood that the planes have been separated for clarity of illustration. In an actual device, the planes are stacked one on the other, and are of a thickness to permit storage of the order of two hunderd planes to the inch.

*Output selector*

Figure 9:
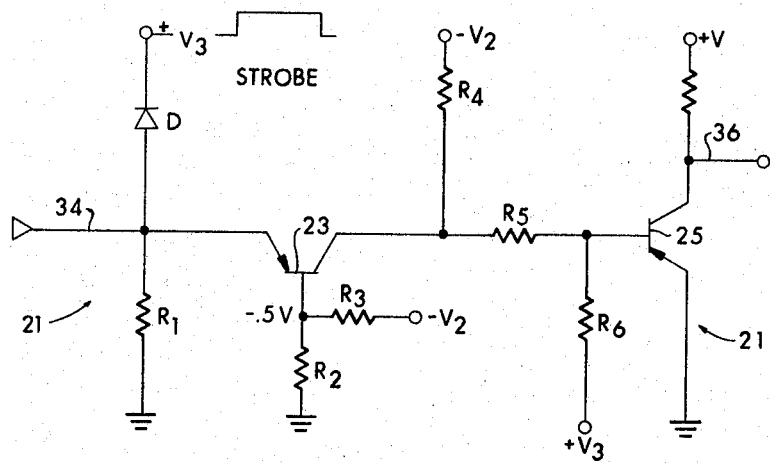
FIG. 9 is a circuit diagram of the output selector of the system of FIG. 1.

The output selector 20 comprises a detection circuit for each of the planes of memory unit 18 for sensing its output and determining on which plane the word is stored. Any threshold detector known in the art capable of generating a signal when the signal it receives is more positive than a selected value may be used. One example of a suitable detector 21 is shown in FIG. 9 and comprises two transistor circuits 23 and 25. As mentioned previously, a perfect word match on a plane 66 of memory unit 18 will produce no voltage on its output load 34, whereas an imperfect match will produce a negative signal whose amplitude depends on the number of incorrect letters in the word. The circuit of FIG. 9 is arranged to generate a voltage indicating a match, only when the signal on its input line 34 is more positive than −0.5 v. This value is based on the arbitrary assumption that one volt is induced in an encircling loop for each bit. This value was chosen so that one incorrect bit in one letter of an otherwise matching word will be considered a correct match. Thus, by changing this negative voltage value, other degrees of mismatch will still be acceptable as a match for such applications as the page reader, mentioned in the introduction.

The voltage divider comprising resistors $R_2$ and $R_3$ maintains the base of transistor 23 at −0.5 volt. When the associated plane 66 of the memory unit 18 is not generating a match signal, a control device, such as the letter sending apparatus, applies a negative strobe level on the cathode of diode D, placing a large negative voltage $V_3$ on the emitter of transistor 23, preventing it from conducting. At the same time, the potentials applied to transistor 25 cause it to conduct, causing output terminal 36 to be at essentially ground potential. When, however, planes 66 generate match signals, the strobe level is caused to go positive, thereby back biasing diode D and effectively removing it from the circuit. If a signal from plane 66 appearing on line 34 is more positive than −0.5 v., transistor 23 conducts, the current flow through resistor $R_4$ reducing the potential at the junction of resistors $R_4$ and $R_5$ to a value to cut transistor 25 off and to produce a positive output pulse at terminal 36. If a signal more negative than −0.5 v. appears on input terminal 34, transistor 23 cannot conduct, and since transistor 25 is normally conducting, no signal is produced at output terminal 36. Thus, only those signals indicating a match between the coded input word and a stored word will generate an output signal indicative of the match.

As mentioned above, output selector 20 comprises a plurality of detectors 21, one for each of the memory planes 66, only three of which have been illustrated. The three output lines 36 are connected to binary coder 22 which senses which one of these lines contains a signal.

*Binary coder*

Figure 10:
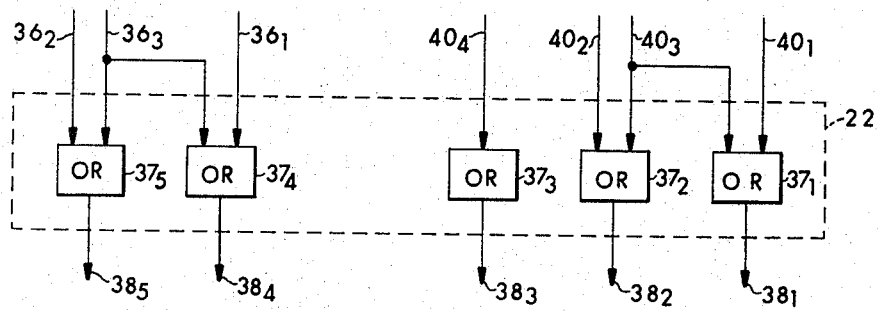
FIG. 10 is a block diagram of the binary coder portion of the system of FIG. 1; and, FIG. 11 is a block diagram of the output register portion of the system of FIG. 1.

Binary coder 22, shown schematically in FIG. 10 comprises a plurality of OR gates 37, five of which are illustrated for purposes of describing system operation, for sensing the outputs of output selector 20 and the word length selector 14, and producing a five bit binary word indicating the length of the searched word and the plane 66 on which it is located. Of the five OR gates shown, gates $37_1$, $37_2$ and $37_3$ to which the four lines $40_1$–$40_4$ from the word selector 14 are connected as shown, are operative to sense the outputs of the word selector. The system logic being such that an output appears on only one of these lines at any one time, a signal appearing on line 40 causes OR gate 37 to produce a ONE signal on its output line 38, whereby the binary digits ZERO, ZERO and ONE appear on output lines $38_3$, $38_2$, and $38_1$, respectively. Similarly, when a signal appears only on line $40_2$, OR gate $37_2$ produces a ONE on its output line $38_2$, and ZERO's appear on the other two, representing the digits 010. Line $40_3$ being connected to both of OR gates $37_1$ and $37_2$, a signal on this line causes both of these gates to produce a ONE and the binary digits 011 are represented. Finally, a signal on line $40_4$ causes OR gate $37_3$ to produce a ONE, the three gates in this case representing the digits 100. Thus, the signals appearing on lines $38_3$ $38_2$ and $38_1$ uniquely describe in binary form whether the word has one, two, three or four letters.

The other two OR gates shown in FIG. 10, to which the lines $36_1$, $36_2$ and $36_3$ from the output selector are connected, are operative to indicate on which plane 66 the desired word is stored. A signal appearing on line $36_1$ causes OR gate $37_4$ to deliver a ONE to its output line $38_4$ with a ZERO appearing on output line $38_5$; thus the binary digits 01 are represented by the two outputs. A signal on only line $36_2$ causes OR gate $37_5$ to produce a ONE, and the resulting binary notation is 10. Line $36_3$ being connected to both gates, a signal thereon causes both gates to produce ONE's and the binary digits 11 are produced. Thus, the condition of lines $38_5$ and $38_4$ describe in binary form on which of the three planes 66 shown in FIG. 6 contains the desired word. Accordingly, the bits appearing on lines $38_1$–$38_5$, which are subsequently stored in output register 24, provide an indication of word length and the plane on which the desired word is stored.

*Output register*

Figure 11:
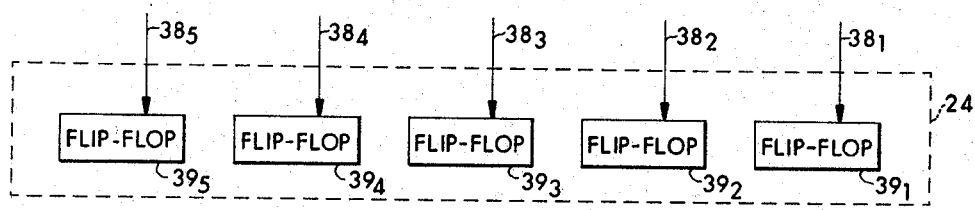

Referring now to FIG. 11, the output register 24 comprises a plurality of set-reset flip-flops $39_1$–$39_5$, one for each of the bits in the output code from the binary coder 22. Each of the flip-flops is operative to be set when a ONE appears on its input line (output of the binary coder) and to remain in its reset condition when a ZERO is present on its input line. Thus, the bits appearing on line $38_1$ to $38_5$ are stored in the output register for subsequent application to an indicator or other utilization device.

From the foregoing, it is seen that applicants have provided a word recognition system employing a solenoid array as a semi-permanent memory device in which matching is accomplished by a comparison of voltage levels. The system features the pre-selection of a parameter of the word, in the illustrative embodiment, its length, but the system could be organized to pre-select on first letter of the word, the second letter, etc. This preselection significantly reduces the number of detectors required to identify the desired word since it allows several words of differing word lengths to be stored on a single plane. The described coding of the individual letters of the words contributes to efficient parallel correlation, and the use of a code having a fixed number of driven bits per letter (i.e., two out of eight) simplifies the system organization and enhances its discriminating capability.

Although a preferred embodiment has been illustrated and described to show the pinciple of the invention, it is to be understood that it is subject to considerable modification without departing from the true spirit thereof. For instance, the input words need not be in the English language, but may be any language, or a coded representation of any language. Also, although the system has been described as having only the ONE solenoids driven, the ZERO solenoids could be driven instead with suitable adjustment of associated circuitry. Further, while the disclosed "two out of eight" code is particularly useful in the system, any code in which all letters may be represented by the same number of ONE's is satisfactory. While a biasing solenoid for each letter improves the discrimination between a match and a mismatch, it is possible, by using more sensitive detectors, to determine a correct word without it. Obviously, too, the registers, selectors and binary coder can take a variety of forms known to the art without departing from the invention. Accordingly, it is not intended to limit the invention to what has been shown and described except as such limitations appear in the appended claims.

What is claimed is:

1. A word recognition system operable in accordance with the letters of an input word in binary notation to locate the address at which a word most nearly matching with said input word is stored, comprising, in combination, a word storage unit including a plurality of data planes stacked one upon the other and each having thereon a different conductive pattern of series-connected loops permanently storing a multiplicity of words, each word having a parameter uniquely distinguishing it from the other words on the plane, each of said loops representing a bit in binary notation, said loops being arranged in groups of equal number in accordance with a predetermined code, each group of loops representing a letter of a word, said planes having a plurality of openings therein centrally located within corresponding loops of the conductive patterns thereon, a like plurality of elongated solenoids, one solenoid extending through corresponding openings in said plurality of planes in a direction normal to said planes and in inductive-coupling relationship with selected ones of the loops on each of said planes, means operative in response to said input word to convert each letter thereof to bits according to said predetermined code, means operative in response to the converted input word to determine the parameter thereof by which it is distinguished from other words on any of said planes, means operative in response to the output of said parameter-determining means to energize only those solenoids coupled to loops on said planes representative of words containing said parameter to thereby simultaneously search all of said planes for the word corresponding to said input word and to induce a signal in the conductive pattern on the plane storing the input word differing from the signal induced in all other planes, and a plurality of signal detecting means, one connected to each of said planes, operative in response to the output of said parameter-determining means and said differing signal from said planes to provide a binary output signal indicative of the distinguishing parameter of said input word and the plane on which the word is stored.

2. A word recognition system operable in accordance with the characters of an input word in binary notation to locate the address at which a word most nearly matching with said input word is stored comprising, in combination, a word storage unit including a plurality of data planes stacked one upon the other and each having thereon a different conductive pattern of series-connective loops permanently storing a multiplicity of words, each word having a parameter uniquely distinguishing it from the other words on the plane, each of said loops representing a bit in binary notation, said loops being arranged in groups of equal number in accordance with a predetermined code, each group of loops representing a character of a word and having the same number of stored binary ONE's as all others of said groups, said planes having a plurality of openings therein centrally located within corresponding loops of the conductive patterns thereon, a like plurality of elongated solenoids, one solenoid extending through corresponding openings in said plurality of planes in a direction normal to said planes and in inductive-coupling relationship with selected ones of the loops on each of said planes, means operative in response to said input word to convert each character thereof to bits according to said predetermined code, means operative in response to the converted input word to determine the parameter thereof by which it is distinguished from other words on any of said planes, means operative in response to the output of said parameter-determining means to energize only those solenoids coupled to loops on said planes representative of words containing said parameter to thereby simultaneously search all of said planes for the word corresponding to said input word and to induce a signal in the conductive pattern on the plane storing the input word differing from the signal induced in all other planes, and a plurality of signal detecting means, one connected to each of said planes, operative in response to the output of said parameter-determining means and said differing signal from said planes to provide a binary output signal indicative of the distinguishing parameter of said input word and the plane on which the word is stored.

3. Apparatus according to claim 2 wherein said solenoid energizing means is operative to energize only a number of solenoids equivalent to the number of identical binary bits in said coded input word.

4. A word recognition system operable in accordance with the letters of an input word in binary notation to locate the address at which a word most nearly matching with said input word is stored comprising, in combination, a word storage unit including a first plurality of data planes stacked one upon the other and each having thereon a different conductive pattern of series connected loops permanently storing a multiplicity of words of different lengths, each of said loops representing a bit in binary notation, said loops being arranged in groups of nine for each letter of each word in accordance with a "two out of eight" code, each plane having a like multiplicity of openings therein located within corresponding loops of the conductive pattern thereon, a like multiplicity of elongated solenoids, one solenoid extending through corresponding openings in said plurality of planes in a direction normal to said planes and in inductive-coupling relationship with selected ones of the loops on each of said planes, eight of the solenoids associated with eight of the loops of each of said groups of loops on said planes being wound in one direction with a given density and the ninth solenoid associated with each of said groups of loops being wound in the opposite direction at one-half said given density, two selected loops of each of said eight loops in a group being arranged to encircle a respective solenoid, the other six of said loops in a group being arranged to by-pass their respective solenoids, and the ninth loop in each of said groups of loops being arranged to encircle its respective solenoid, coding means operative to convert the letters of said input word to "two out of eight" coded representation, pre-selection means operative in response to the coded input word to determine the number of letters in said input word, means operative in response to the output of said pre-selection means and said coding means to energize two only of the solenoids of each of the aforesaid groups of eight solenoids representative of words having the length indicated by said pre-selecting means and in accordance with the two like digits in corresponding letters of said coded word to thereby simultaneously search all of said planes for the word corresponding to said input word and to induce signals in the conductive patterns on each of said planes, means energizing the ninth solenoid in each of said groups of solenoids in which two of the other eight solenoids are energized to induce in its associated loop a signal of opposite polarity and twice the amplitude of the signal induced in a loop encircling one of said other eight energized solenoids, whereby the net signal induced in the plane storing said input word is substantially zero and the net signal induced in all other planes is of measurable magnitude, and a plurality of signal detecting means, one connected to each of said planes, operative in response to the output of said pre-selecting means and the signal induced in the plane storing the input word to produce an output signal in binary notation indicative of the length of said input word and the plane on which it is stored.

5. A word recognition system adapted to determine the location in storage of a word most nearly matching with an input word comprising, in combination, a storage unit including a plurality of stacked data planes, each plane having a plurality of openings therein and a different conductive pattern thereon permanently storing a plurality of words, each word on a plane having a parameter uniquely distinguishing it from all other words on the plane, a plurality of elongated solenoids equal in number to said plurality of openings, each solenoid extending in said plurality of planes in a direction normal to said planes and in inductive-coupling relationship with the conductive patterns of said planes, means for determining the parameter of said input word and for providing a signal indicative thereof, means responsive to said input word and to said signal from the parameter determining means for energizing selected ones of said solenoids associated with the words having the particular parameter determined by said parameter determining means whereby output signals are produced by the planes, and means coupled to said planes operative to provide an output signal indicative of the plane containing the most nearly matching stored word.

6. A word recognition system in accordance with claim 5 wherein the planes other than the planes producing an output signal indicative of the nearest match between the input word and a stored word produces signals having values dependent upon the degrees of mismatch with said input word and wherein said means coupled to said planes is operative to select the plane storing the word most nearly matching with the input word and all planes storing words within a selected degree of mismatch with said input word.

References Cited
UNITED STATES PATENTS

| | | | |
|---|---|---|---|
| 3,031,650 | 4/1962 | Koerner | 340—173 |
| 3,084,336 | 4/1963 | Clemons | 340—174 |
| 3,163,855 | 12/1964 | Bobeck | 340—174 |
| 3,195,116 | 7/1965 | Weisz et al. | 340—174 |
| 3,222,645 | 12/1965 | Davis | 340—172.5 |
| 3,234,528 | 2/1966 | Lincoln et al. | 340—174 |
| 3,239,832 | 3/1966 | Renard | 340—172.5 |
| 3,245,054 | 4/1966 | Byron et al. | 340—174 |
| 3,245,058 | 4/1966 | Bruce | 340—174 |
| 3,249,923 | 5/1966 | Simshauser | 340—172.5 |

OTHER REFERENCES

Pages 40–44 and 46–48, Feb. 1, 1963, Corneretto, A., Associative Memories. In Electronic Design.

Pages 20–21, March 1961, Bruce, G. D., Associative Semi-Permanent Memory. In IBM Technical Disclosure Bulletin.

Pages 18–19, March 1961, Bruce, G. D., Semi-Permanent Memory. In IBM Technical Disclosure Bulletin.

ROBERT C. BAILEY, *Primary Examiner.*

J. P. VANDENBURG, *Assistant Examiner.*